US010788302B2

(12) United States Patent
Swenson, Jr.

(10) Patent No.: US 10,788,302 B2
(45) Date of Patent: Sep. 29, 2020

(54) MODULAR MECHANICAL BORE GAUGE SYSTEM

(71) Applicant: Dorsey Metrology International, Poughkeepsie, NY (US)

(72) Inventor: Mark R. Swenson, Jr., Poughkeepsie, NY (US)

(73) Assignee: Dorsey Metrology International, Poughkeepsie, NY (US)

( * ) Notice: Subject to any disclaimer, the term of this patent is extended or adjusted under 35 U.S.C. 154(b) by 214 days.

(21) Appl. No.: 16/125,209

(22) Filed: Sep. 7, 2018

(65) Prior Publication Data

US 2020/0080829 A1   Mar. 12, 2020

(51) Int. Cl.
*G01B 3/46* (2006.01)
*G01B 5/12* (2006.01)

(52) U.S. Cl.
CPC ............... *G01B 3/46* (2013.01); *G01B 5/12* (2013.01)

(58) Field of Classification Search
CPC ........................................................ G01B 3/46
USPC ........................................................... 33/542
See application file for complete search history.

(56) References Cited

U.S. PATENT DOCUMENTS

| 2,566,160 | A | * | 8/1951 | Bowers | G01B 5/12 |
| | | | | | 33/827 |
| 2,642,672 | A | * | 6/1953 | Lewis | G01B 5/12 |
| | | | | | 33/544.5 |
| 4,265,026 | A | * | 5/1981 | Meyer | G01B 3/26 |
| | | | | | 33/501.4 |
| 4,483,078 | A | * | 11/1984 | Stevens | G01B 5/12 |
| | | | | | 33/542 |
| 4,809,440 | A | * | 3/1989 | Rutter | G01B 3/26 |
| | | | | | 33/501.3 |
| 4,866,855 | A | | 9/1989 | Rutter | |
| 5,848,479 | A | * | 12/1998 | MacIndoe | G01B 3/46 |
| | | | | | 33/542 |
| 6,490,805 | B1 | * | 12/2002 | Forschler | G01B 3/46 |
| | | | | | 33/542 |
| 7,043,835 | B2 | * | 5/2006 | Wiseman | B23Q 3/18 |
| | | | | | 29/407.04 |
| 9,038,283 | B2 | | 5/2015 | Luty et al. | |
| 2009/0235546 | A1 | * | 9/2009 | Klepp | G01B 3/26 |
| | | | | | 33/502 |
| 2015/0107126 | A1 | * | 4/2015 | Sluder, III | G01B 3/28 |
| | | | | | 33/506 |

OTHER PUBLICATIONS

Bore Gages, Starrett, Copyright 2018, 3 pages, http://www.starrett.com/categore/precision-measuring-tools/bore-gages/1106.

* cited by examiner

*Primary Examiner* — George B Bennett
(74) *Attorney, Agent, or Firm* — Saile Ackerman LLC; Stephen B. Ackerman; Rosemary L. S. Pike

(57) ABSTRACT

The modular bore gauge system comprises a plurality of modular spring-loaded bore gauge head adaptors, each having a bore gauge head on a first end thereof and having a female threaded second end, a plurality of modular spring-loaded depth extensions, each having a first male threaded end and a second female threaded end and configured to have its first end screwed onto the second end of one bore gauge head adaptors or to have its first end screwed onto the second end of another one of the depth extensions, and a modular indicator adaptor, configured to have an indicator fitted on a first end thereof and a male threaded second end and configured to have its second end screwed onto the second end of one of the bore gauge head adaptors or screwed onto the second end of a last in line of one of the depth extensions.

18 Claims, 5 Drawing Sheets

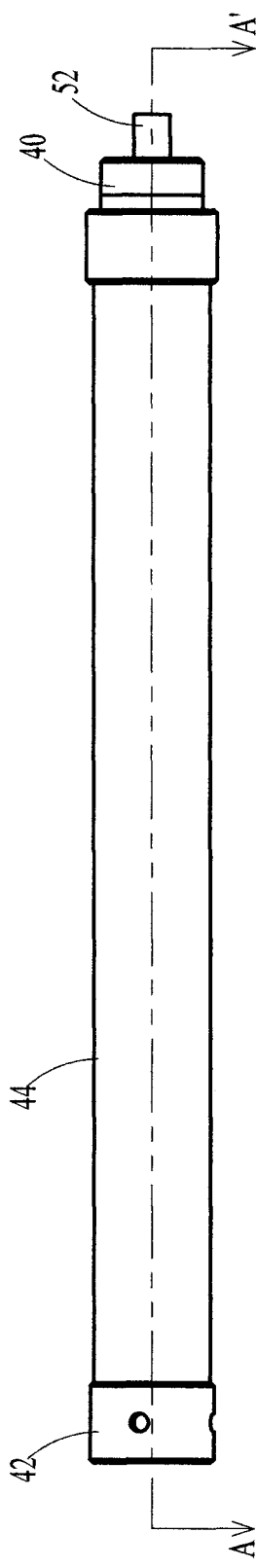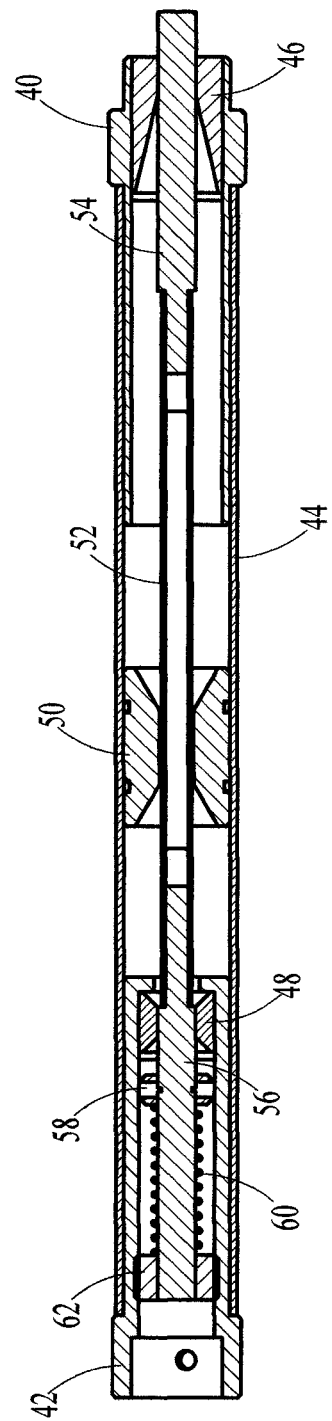
Figure 5
Figure 6

MODULAR MECHANICAL BORE GAUGE SYSTEM

(1) TECHNICAL FIELD

The disclosure relates to a bore gauge system, and more particularly, to a modular bore gauge system wherein depths, indicators, and set diameters can be changed easily.

(2) BACKGROUND

A bore gauge is a precision hand tool for checking inside dimensions of holes at a fixed gauging depth range. It is very cumbersome to change the gauging depth or diameter range. Additionally, there are several parts including springs that can be lost during changing of depth or diameter range. Exposing internal parts to potential dust and foreign matter could render the gauge unusable. It is also labor intensive and requires specialized parts and skill to make a component change to a bore gauge.

U.S. Pat. No. 4,866,855 (Rutter) and U.S. Pat. No. 9,038,283 (Luty et al) teach various types of bore gauges. These are different from the bore gauge of the present disclosure.

SUMMARY

A principal object of the present disclosure is to provide a modular bore gauge system that facilitates changing gauge heads, gauging depths, and indicators.

Another object of the disclosure is to provide a method of making a modular bore gauge system that facilitates changing gauge heads, gauging depths, and indicators.

In accordance with the objects of the disclosure, a modular bore gauge system is described. The modular bore gauge system comprises a plurality of modular spring-loaded bore gauge head adaptors, each having a bore gauge head on a first end thereof and having a female threaded second end, a plurality of modular spring-loaded depth extensions, each having a first male threaded end and a second female threaded end and configured to have its first end screwed onto the second end of one of the plurality of bore gauge head adaptors or to have its first end screwed onto the second end of another one of the plurality of depth extensions, and a modular indicator adaptor, configured to have an indicator fitted over a first end thereof and having a male threaded second end and configured to have its second end screwed onto the second end of one of the plurality of bore gauge head adaptors or to have its second end screwed onto the second end of a last in line of one of the plurality of depth extensions. All bore gauge head adaptors, depth extensions, and indicators are configured to be interchanged without specialized tools.

Also in accordance with the objects of the disclosure, a method of fabricating a modular bore gauge system is described. A plurality of modular spring-loaded bore gauge head adaptors are fabricated, each having a bore gauge head on a first end thereof and having a female threaded second end. A plurality of spring-loaded depth extensions are fabricated, each having a first male threaded end and a second female end and configured to have its first end screwed onto the second end of one of the plurality of bore gauge head adaptors or to have its first end screwed onto the second end of another one of the plurality of depth extensions. An indicator adaptor is fabricated, configured to have an indicator fitted on a first end thereof and having a second male threaded end, and configured to have its second end screwed onto the second end of one of the plurality of bore gauge head adaptors or to have its second end screwed onto the second end of a last in line of one of the plurality of depth extensions.

Also in accordance with the objects of the disclosure, a method of using a modular bore gauge is described. A modular bore gauge system is provided comprising a plurality of modular spring-loaded bore gauge head adaptors, each having a bore gauge head on a first end thereof and having a female threaded second end, a plurality of modular spring-loaded depth extensions, each having a first male threaded end and a second female threaded end and configured to have its first end screwed onto the second end of one of the plurality of bore gauge head adaptors or to have its first end screwed onto the second end of another one of the plurality of depth extensions, and a modular indicator adaptor, configured to have an indicator fitted on a first end thereof and having a male threaded second end and configured to have its second end screwed onto the second end of one of the plurality of bore gauge head adaptors or to have its second end screwed onto the second end of a last in line of one of the plurality of depth extensions. A bore gauge head adaptor having a desired set diameter is chosen. An indicator is chosen and fitted onto the first end of the indicator adaptor. The second end of the indicator adaptor is screwed onto the second end of the chosen bore gauge head adaptor.

Optionally, a first modular depth extension having a desired length is chosen. A first end of the chosen first modular depth extension is screwed onto a second end of the bore gauge head adaptor and the second end of the indicator adaptor is screwed onto the second end of the chosen first modular depth extension. Optionally, a second modular depth extension is chosen. A first end of a second modular depth extension is screwed onto a second end of the first modular depth extension. Additional modular depth extensions are chosen and added until a desired depth is reached. The second end of the indicator adaptor is screwed onto the second end of a last in line modular depth extension. Measurements are performed with the customized modular bore gauge.

BRIEF DESCRIPTION OF THE DRAWINGS

In the accompanying drawings forming a material part of this description, there is shown:

FIG. 5 is an exterior view of the depth extension of the present disclosure.

FIG. 6 is a cross-section along A-A' of FIG. 5.

DETAILED DESCRIPTION

The bore gauge of the present disclosure is modular, versatile, and much quicker and easier to adjust than other bore gauges. All gauging heads are built with all critical components secured internally and the parts can be simply twisted together. All depth extensions and indicator adaptors are designed in the same way such that depths, indicators, and set diameters can easily be changed with no special tools. These changes can be made very quickly with no specialized skill required.

Figure 1:
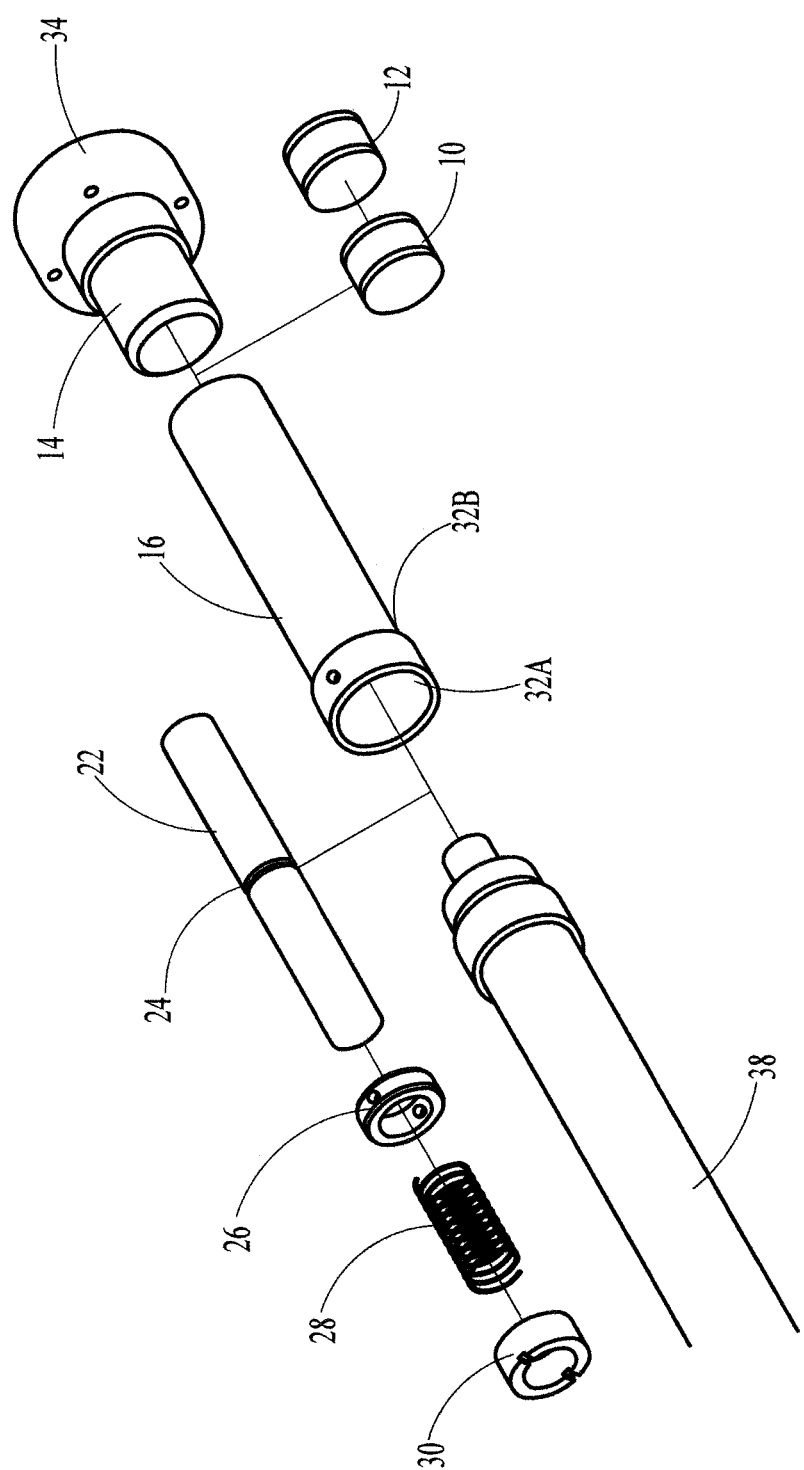
FIG. 1 is an isometric view of a preferred embodiment of a bore gauge of the present disclosure.

The bore gauge of the present disclosure is a modular system to facilitate easily changing gauging heads, gauging depths, and indicators. Referring now to FIG. 1, two bronze bushings 10 and 12 are inserted into a modified bore gauge collar 14 to provide a precision guide. A gauge head adaptor 16 is made that press fits onto the bore gauge collar 14. After the bore gauge adaptor 16 is pressed onto the collar 14, the combined set of parts is line reamed so the bearing surfaces are perfectly in line and reamed to the precise size so there is no axial deflection.

Next the gauging plunger 22 is machined, heat treated, and precision ground to glide through the bushings 10 and 12 with no resistance. On the opposite end of the gauge head adapter 16 are two female threaded areas, one 32A to connect to the depth extension and the other 32B to lock in the gauging plunger 22. The clamping collar 26 clamps to the gauging plunger 22 to prevent the gauging plunger 22 from falling through the gauge head adapter 16. The clamping collar cannot pass by the shoulder that is created by the collar 14 being press fitted into the gauge head adapter 16. Once the clamping collar is in place and the gauging plunger 22 is inserted into the gauge head adapter 16, a spring 28 is inserted around the plunger. The spring 28 rests on the clamping collar 26 which acts as a stop.

Next, a threaded guide bushing 30 is machined with a slot in the top, to then be screwed into the inner female thread 32B on the gauge head adapter 16. This threaded bushing 30 is screwed down tight. This applies pressure on the spring 28 and makes the gauging plunger 22 spring loaded. This spring-loaded action keeps all internals contained as well as provides the necessary force against the gauge head, so everything functions completely stand alone.

This completely self-contained spring-loaded bore gauge adaptor 16/14 is then press fitted to the bore gauge head 34. Once fitted to the bore gauge head 34 of choice it no longer needs any tools or adjustments. A variety of sizes of bore gauge heads 34 can be modularized. The collar 14 of each gauge head 34 is press fitted to its own bore gauge head adaptor 16 as described above. This allows for the user to gauge bores from 1-24" diameter or more, depending on the size of the modular bore gauge head, at various gauging depths without requiring specialized gauges for each check dimension.

Figure 2:
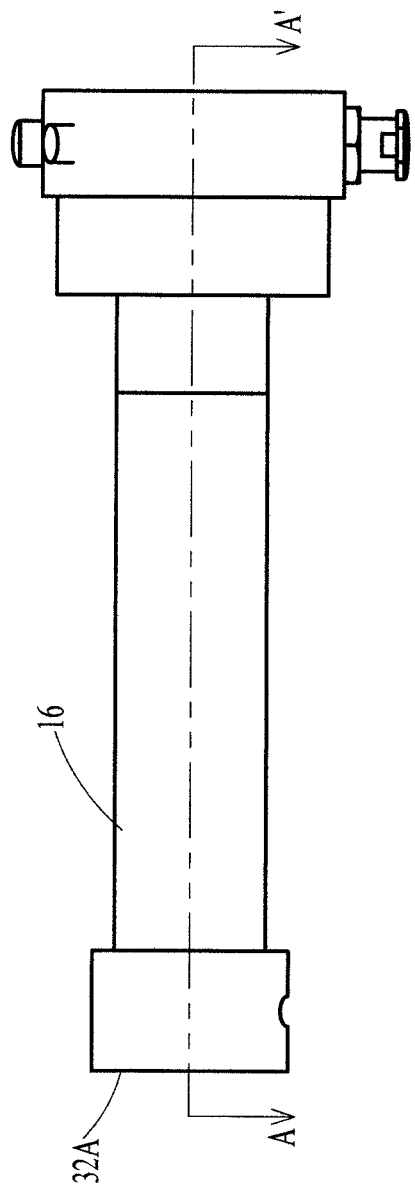
FIG. 2 is an exterior view of a bore gauge adaptor of the present disclosure.
Figure 3:
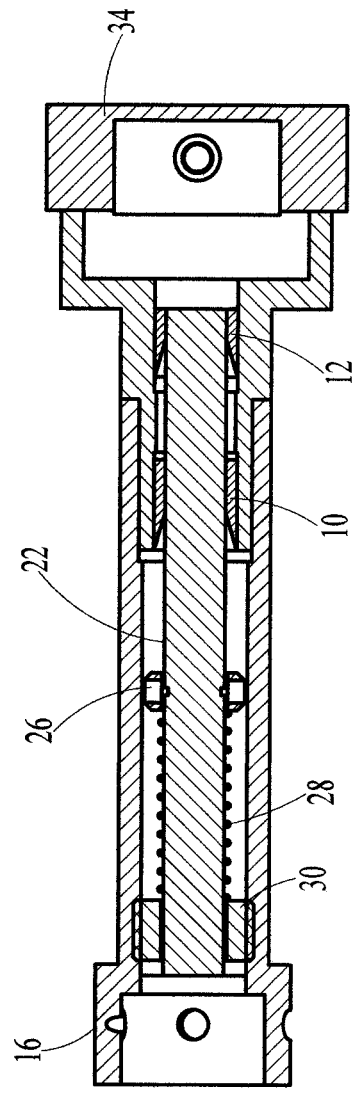
FIG. 3 is a cross-section along A-A' of FIG. 2.

FIG. 2 is an exterior view of the gauge head adaptor 16, collar 14, and gauge head 34. FIG. 3 shows a cross-section along view A-A' of FIG. 2 where it can be seen that all the parts of the gauge head adaptor are secured internally.

Figure 4:
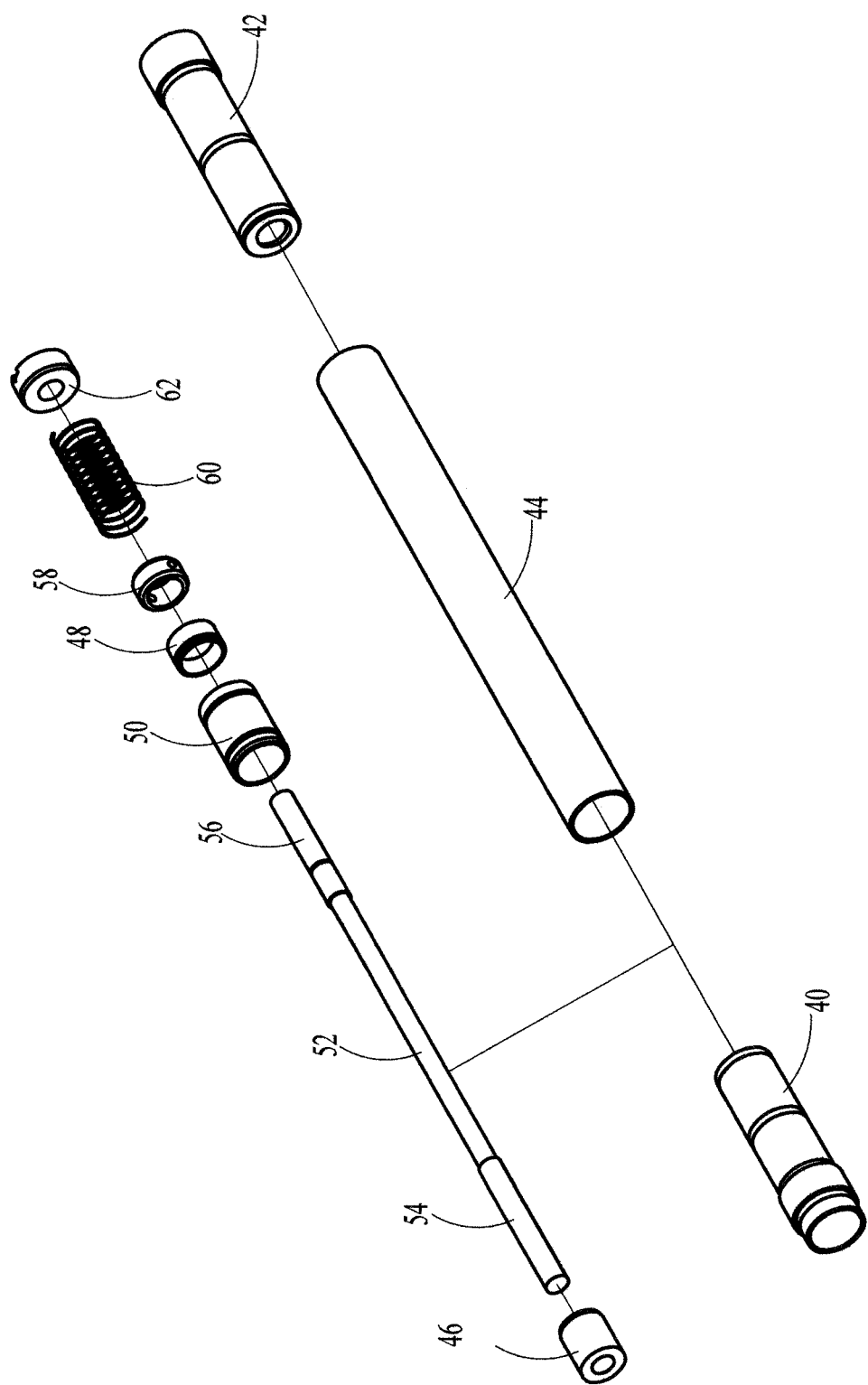
FIG. 4 is an isometric view of a depth extension of the bore gauge of the present disclosure.

Next, the depth extension is made and assembled. The depth extension can be made to accommodate many gauging depths as well as can be combined with other depth extensions making the system completely modular and versatile. Referring now to FIG. 4, we start by machining a steel male connector 40 and female connector 42. Next, bushing 46 is press fitted into the male connector 40 so that it is flush with the end. Bushing 48 is press fitted into the female connector 42. These two parts are then line reamed to ensure they are in line and reamed to the precise size.

Next, a carbon fiber tube 44 is cut to the necessary length. The guide bushing 50 is pressed to the center of the carbon fiber tube 44 if the depth extension 38 is 18" or longer. Once the guide bushing 50 is in place, the male and female connectors 40 and 42 are epoxied into opposite ends of the carbon fiber tube 44. Alternatively, the tube could be made of steel and the male and female connectors 40 and 42 press fitted into the opposite ends of the tube instead of epoxied.

The gauging plunger 52 is then assembled with the two connectors 54 and 56 pressed on each end of the gauging plunger 52. The ends are machined, heat-treated, and ground to ensure a precise transfer of movement. There is a radiused or convex tip on the male side end connector 54 and a flat ground tip on the female end side connector 56. The tips are ground this way so that a radiused tip only contacts a flat tip. This is to eliminate and/or reduce any transfer error in combining attachments.

Once the gauging plunger 52 is made, a clamping collar 58 is installed so the gauging plunger 52 will not fall through the depth extension 38. After the epoxy has dried, the gauging plunger 52 is inserted into the carbon fiber tube 44. Spring 60 is inserted, and the threaded guide bushing 62 screwed in until tight. Once assembled, the depth extension 38 becomes lightly spring loaded and is completely contained so no parts can be lost or not installed properly. The gauging plunger 52 protrudes on the male end 40 and is receded on the female end 42 to account for the threading together of multiple extensions.

FIG. 5 is an exterior drawing of the depth extension 38. FIG. 6 shows a cross-section along A-A' of FIG. 5 where it can be seen that all the parts of the depth extension 38 are secured internally. The male connector 40 end of the depth extension 38 will be screwed into the end 32A of the gauge head adaptor 16 (as shown in FIG. 1). The gauging plunger 52 will move freely within the depth extension 38. An additional depth extension 38 may be screwed into the female connector end 42. Any number of desired depth extensions 38 may be chained in this way.

Figure 7:
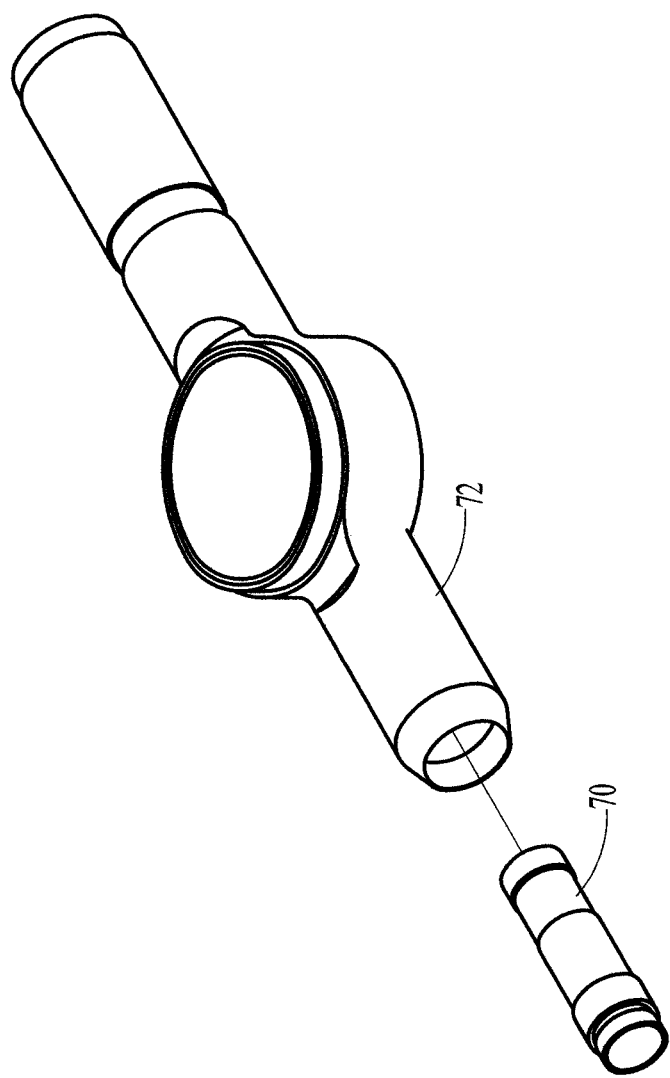
FIG. 7 is an isometric view of an indicator adaptor and of the present disclosure.

Referring now to FIG. 7, an indicator adaptor 70 is described. The indicator adaptor 70 is a male threaded connector with no other parts. A variety of types of indicators 72 can be slip fitted over the end opposite the male threaded end of the indicator adaptor 70. The male and female threaded ends on the bore gauge adapter 16, indicator adaptor 70, and depth extensions 38 are all the same which gives the system versatility and its modular aspect. Indicators have different graduations and revolution counters. The necessary indicator 72 is determined by the customer's part tolerance. That is, if the customer has a part tolerance of +1-0.001 that means they would require an indicator with a 0.0001" graduation (10% of the part tolerance). For example, indicators come in 0.00005", 0.0001", 0.00025", 0.0005", and 0.001" English graduations as well as 0.001 mm, 0.002 mm, 0.005 mm, and 0.01 mm metric graduations. Digital indicators may alternatively be slip fitted onto the indicator adaptor. There are two sets screw on the indicator 72 that hold it in place on the indicator adaptor 70. The set screws are used to make any final fine adjustments so that all components are aligned and set properly.

The indicator adaptor 70 is screwed into the end 32A of the bore gauge head adaptor 16 if no depth extension 38 is required. If one or more depth extensions 38 are to be used, the indicator adaptor 70 will be screwed into the female connector 42 of the last depth extension 38 connected to the bore gauge head adaptor 16.

The bore gauge of the present disclosure is a modular system wherein gauging heads 34, depth extensions 38, and indicators 72 are fabricated with all critical components secured internally. The modular parts can be simply twisted together, quickly and easily with no specialized tools or skills. Thus, depths, indicators, and set diameters on the bore gauge of the present disclosure can easily be changed.

Although the preferred embodiment of the present disclosure has been illustrated, and that form has been described in detail, it will be readily understood by those skilled in the art that various modifications may be made therein without departing from the spirit of the disclosure or from the scope of the appended claims.

What is claimed is:

1. A modular bore gauge system comprising:
    a plurality of modular spring-loaded bore gauge head adaptors, each having a bore gauge head on a first end thereof and having a female threaded second end;
    a plurality of modular spring-loaded depth extensions, each having a first male threaded end and a second female threaded end and configured to have its first end screwed onto said second end of one of said plurality of bore gauge head adaptors or to have its first end screwed onto the second end of another one of said plurality of depth extensions; and
    a modular indicator adaptor, configured to have an indicator fitted on a first end thereof and a male threaded second end and configured to have its second end screwed onto said second end of one of said plurality of bore gauge head adaptors or to have its second end screwed onto the second end of a last in line of one of said plurality of depth extensions
    wherein said bore gauge head adaptors, said depth extensions, and said indicator adaptors are configured to be interchanged without specialized tools.

2. The modular bore gauge system according to claim 1 wherein each of said plurality of modular bore gauge adaptors comprises:
    a collar press fitted to said bore gauge head and containing at least one bushing;
    a plunger fitted inside said bore gauge adaptor and configured to glide through said at least one bushing;
    clamping a clamping collar to said plunger; and
    a spring around said plunger and held between a clamping collar and a guide bushing wherein said guide bushing is screwed into an inner threading of said female threaded end of said bore gauge adaptor.

3. The modular bore gauge system according to claim 1 wherein each of said plurality of modular depth extensions comprises:
    a tube having a male connector end and a female connector end wherein a bushing is fitted in each of said male and female connectors;
    a gauging plunger having one convex end and one flat end inserted in said tube wherein said convex end is aligned with said male connector and said flat end is aligned with said female connector; and
    a spring around said gauging plunger and held between a clamping collar and a threaded guide bushing.

4. The modular bore gauge system according to claim 3 wherein said male and female connectors comprise steel.

5. The modular bore gauge system according to claim 4 wherein said tube comprises carbon fiber and wherein said male and female connectors are epoxied to opposite ends of said tube.

6. The modular bore gauge system according to claim 4 wherein said tube comprises steel and wherein said male and female connectors are press fitted onto opposite ends of said tube.

7. A method of fabricating a modular bore gauge system comprising:
    fabricating a plurality of modular spring-loaded bore gauge head adaptors, each having a bore gauge head on a first end thereof and having a female threaded second end;
    fabricating a plurality of spring-loaded depth extensions, each having a first male threaded end and a second female end and configured to have its first end screwed onto said second end of one of said plurality of bore gauge head adaptors or to have its first end screwed onto the second end of another one of said plurality of depth extensions; and
    fabricating an indicator adaptor, configured to have an indicator on a first end thereof and a second male threaded end and configured to have its second end screwed onto said second end of one of said plurality of bore gauge head adaptors or to have its second end screwed onto the second end of a last in line of one of said plurality of depth extensions.

8. The method according to claim 7 wherein said fabricating a plurality of modular spring-loaded bore gauge head adaptors comprises the steps:
    providing a plurality of bore gauge heads each being press fitted onto a collar;
    for each bore gauge head,
        inserting at least one bushing into said collar;
        press fitting a first end of a gauge head adaptor onto said collar wherein said gauge head adaptor has a second end having an inner and an outer female threaded area therein;
        machining and precision grinding a plunger;
        clamping a clamping collar to said plunger;
        thereafter inserting said plunger into a second end of said gauge head adaptor wherein said plunger will glide through said at least one bushing in said collar;
        inserting a spring around said plunger and against said clamping collar;
        machining a threaded guide bushing having a slot in its surface;
        screwing said guide bushing into said inner female threaded area on said gauge head adapter wherein pressure is applied to said spring and wherein said plunger is spring loaded.

9. The method according to claim 8 comprising inserting two bushings into said collar.

10. The method according to claim 8 after said press fitting a first end of a gauge head adaptor onto said collar, further comprising reaming said gauge head adaptor so there is no axial deflection.

11. The method according to claim 7 wherein said fabricating each of a plurality of spring-loaded depth extensions comprises the steps:
    press fitting a bushing into each of a male connector and a female connector;
    cutting a tube to a desired length and attaching said male and female connectors to opposite ends of said tube;
    machining a gauging plunger to have one convex end and one flat end;
    installing a clamping collar on said gauging plunger;
    inserting said gauging plunger into said tube wherein said convex end is aligned with said male connector and said flat end is aligned with said female connector;
    thereafter inserting said spring onto said plunger and screwing in a threaded guide bushing to complete assembly of said depth extension wherein said depth extension is spring loaded.

12. The method according to claim 11 wherein said male and female connectors comprise steel.

13. The method according to claim 12 wherein said tube comprises carbon fiber and wherein said male and female connectors are epoxied to opposite ends of said tube.

14. The method according to claim 12 wherein said tube comprises steel and wherein said male and female connectors are press fitted onto opposite ends of said tube.

15. The method according to claim 11 further comprising pressing a guide bushing to a center of said tube if said tube is 18" or longer.

16. A method of using a modular bore gauge comprising:
providing a modular bore gauge system comprising:
    a plurality of modular spring-loaded bore gauge head adaptors, each having a bore gauge head on a first end thereof and having a female threaded second end;
    a plurality of modular spring-loaded depth extensions, each having a first male threaded end and a second female threaded end and configured to have its first end screwed onto said second end of one of said plurality of bore gauge head adaptors or to have its first end screwed onto the second end of another one of said plurality of depth extensions; and
    an indicator adaptor, configured to have an indicator fitted on a first end thereof and a male threaded second end and configured to have its second end screwed onto said second end of one of said plurality of bore gauge head adaptors or to have its second end screwed onto the second end of a last in line of one of said plurality of depth extensions choosing a bore gauge head adaptor having a desired set diameter;
choosing an indicator and slip fitting it on said first end of said indictor adaptor;
screwing said second end of said indicator adaptor onto said second end of chosen said bore gauge head adaptor; and
thereafter performing measurements with customized said modular bore gauge.

17. The method according to claim 16 further comprising:
choosing a first modular depth extension having a desired length;
screwing a first end of chosen said first modular depth extension onto a second end of said bore gauge head adaptor; and
screwing said second end of said indicator adaptor onto said second end of chosen said first modular depth extension.

18. The method according to claim 17 further comprising:
choosing a second modular depth extension;
screwing a first end of a second modular depth extension onto a second end of said first modular depth extension;
choosing and adding additional modular depth extensions until a desired depth is reached; and
screwing said second end of said indicator adaptor onto said second end of a last in line modular depth extension.

* * * * *